(No Model.)
H. A. HARVEY.
ROLLED WOOD SCREW.
No. 319,247. Patented June 2, 1885.
Figure 1.
Figure 2.
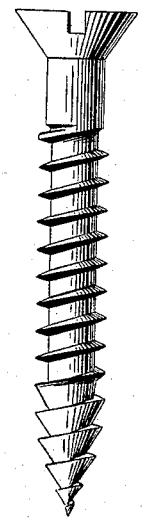
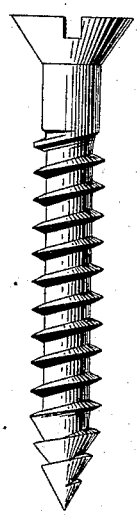
Witnesses:
M. L. Adams.
R. C. Howes.
Inventor:
H. A. Harvey
Per Edw. E. Quimby,
Atty.

United States Patent Office.

HAYWARD A. HARVEY, OF ORANGE, NEW JERSEY.

ROLLED WOOD-SCREW.

SPECIFICATION forming part of Letters Patent No. 319,247, dated June 2, 1885.

Application filed May 6, 1884. (No model.)

*To all whom it may concern:*

Be it known that I, HAYWARD A. HARVEY, of Orange, New Jersey, have invented a certain Improvement in Rolled Wood-Screws, of which the following is a specification.

My invention consists, broadly, in a wood-screw having a thread of uniform pitch, but with some of its convolutions varying from others in thickness or shape in cross-section. For example, I may form upon the pointed end of the blank a ratchet-thread occupying the position of the usual gimlet-pointed thread, while upon the body of the blank, above the point, I form the ordinary wood-screw thread, the several convolutions of which have comparatively narrow bases and constitute the side walls of the usual flat-bottomed groove. Thus constructed, a screw has the capacity of being easily driven into wood possessed by ratchet-threaded screws, and also has the holding capacity of screws having the ordinary wood-screw thread.

The accompanying drawings represent in elevation two screws containing my improvement.

Figure 1 represents a comparatively acutely-pointed screw, in which the ratchet-thread is continued nearly to the extreme point. Fig. 2 represents a less acutely-pointed screw, in which the ratchet-thread terminates upon the cone at a greater distance from the point.

My improved screw, which it would be difficult to make by cutting the thread in the ordinary way, can be easily made by means of dies which roll the thread upon the body of the blank. The shape of these dies in cross-section is simply the reverse of the shape of the threaded part of the screw. The working-face of the part of the die which forms the thread upon the body A of the screw is the same as that of the rolling-dies now in use for this purpose. The part of the die which forms the ratchet-thread upon the pointed end B of the screw has its working-face inclined relatively to the other portion of the die, and has in cross-section a shape which is the reverse of the shape in longitudinal section of the pointed end of the screw. The ratchet-thread upon the pointed end B adapts the screw for being driven in two advantageous respects: First, it gives the screw a conical point, by means of which it is centralized in the act of driving; secondly, the point of the screw is strengthened, so that it is better enabled to overcome the resistance which it meets in entering the material into which it is driven.

I claim as my invention—

A pointed rolled wood-screw having a thread of uniform pitch, the convolutions of which upon and near its pointed end vary in thickness or shape in cross-section from the convolutions upon the adjoining portion of its body.

H. A. HARVEY.

Witnesses:
   R. C. HOWES,
   M. L. ADAMS.